UNITED STATES PATENT OFFICE.

ADAM CAIRNS, OF GLASGOW, SCOTLAND.

SUBSTITUTE FOR RUBBER OR GUTTA-PERCHA.

SPECIFICATION forming part of Letters Patent No. 680,426, dated August 13, 1901.

Application filed December 11, 1899. Serial No. 739,920. (No specimens.)

*To all whom it may concern:*

Be it known that I, ADAM CAIRNS, rubber-works manager, a subject of the Queen of the United Kingdom of Great Britain and Ireland, residing at 110 Commerce street, Glasgow, Scotland, have invented new and useful Improvements in Substitutes for Rubber or Gutta-Percha, of which the following is a specification.

This invention relates to and has for its object the preparation and application of an improved substitute for rubber and gutta-percha whereby a cheaper and superior result is obtained than is possible with the ordinary rubber or gutta-percha substitutes at present employed.

In the carrying out of my invention I take vegetable fiber, preferably in the form of cotton, and act on the same with an alkali and bisulfid of carbon in the presence of water; but I sometimes find it convenient to add also a suitable proportion of shale spirit or coal-tar, naphtha, and lime. This specially-prepared substitute is then added to an ordinary rubber or gutter-percha mixing for the production of rubber or gutta-percha goods. With regard to the rubber mixing, in order to neutralize or prevent the injurious action of the alkali on the rubber and to allow of the sulfur exerting its vulcanizing effect I find it convenient to add a suitable proportion of sulfate of zinc or other suitable salt. An acid can also be used, but is less convenient in its application.

The ingredients, for instance, in the case of a rubber mixing for waterproofing cloth, usually consist of rubber, ordinary substitute, and compounds, which are thoroughly mixed and then made into a dough with solvent naphtha, and it is when in the doughing-mill that the requisite quantity of the above-described substitute is added and incorporated thoroughly with it. The finished dough is then spread upon the cloth in the ordinary way, either wholly or partly, as the case may require, or the dough may be made thin and run on the fabric with the subsequent application of one or more coats of the substitute mixed with rubber and other ingredients, or the proofing may, if desired, be finished with one or more coats of pure rubber dough.

I find that by the use of rubber mixtures containing the improved substitute a sheet of rubber is obtained which is less porous and considerably cheaper than can otherwise be produced, and in the proofing of cloth a lesser weight is required to make the cloth waterproof than would suffice with the ordinary mixings now in use.

In dealing with gutta-percha it is made into a dough with any suitable solvent and mixed in any suitable proportion with the improved substitute, prepared as hereinbefore described. I find the said gutta-percha substitute to be very suitable for use in the manufacture of golf-balls, gutta-percha belting, covering wire, and general electrical purposes.

I claim—

1. The herein-described composition of matter consisting of vegetable fiber, subjected to the action of caustic alkali and carbon bisulfid in the presence of water, and rubber or gutta-percha mixings, substantially as described.

2. The herein-described composition of matter consisting of vegetable fiber, subjected to the action of caustic alkali and carbon bisulfid in the presence of water, and mixed with rubber or gutta-percha mixings with the addition of sulfate of zinc or other suitable salt, substantially as described.

ADAM CAIRNS.

Witnesses:
JAMES YATE JOHNSON,
JAMES LAWRENCE WELLS.